(12) United States Patent
Faukland (10) Patent No.: US 12,338,039 B2
(45) Date of Patent: Jun. 24, 2025

(54) CARDBOARD BOX FOR HOLDING CONTENT, AND A METHOD FOR USING SUCH

(71) Applicant: Moltzau Packaging AS, Skedsmokorset (NO)

(72) Inventor: Eirik Faukland, Skedsmokorset (NO)

(73) Assignee: MOLTZAU PACKAGING AS, Skedsmokorset (NO)

( * ) Notice: Subject to any disclaimer, the term of this patent is extended or adjusted under 35 U.S.C. 154(b) by 0 days.

(21) Appl. No.: 17/998,477

(22) PCT Filed: May 11, 2021

(86) PCT No.: PCT/NO2021/050120
§ 371 (c)(1),
(2) Date: Nov. 10, 2022

(87) PCT Pub. No.: WO2021/230753
PCT Pub. Date: Nov. 18, 2021

(65) Prior Publication Data
US 2023/0242301 A1 Aug. 3, 2023

(30) Foreign Application Priority Data

May 12, 2020 (NO) .................................. 20200559
Feb. 23, 2021 (NO) .................................. 20210231

(51) Int. Cl.
*B65D 5/40* (2006.01)
*B65D 5/20* (2006.01)
(Continued)

(52) U.S. Cl.
CPC ............. *B65D 5/40* (2013.01); *B65D 5/2047* (2013.01); *B65D 5/246* (2013.01); *B65D 5/445* (2013.01);
(Continued)

(58) Field of Classification Search
CPC ........ B65D 5/40; B65D 5/2047; B65D 5/246; B65D 5/445; B65D 5/563; B65D 5/62;
(Continued)

(56) References Cited

U.S. PATENT DOCUMENTS 3,135,455 A 6/1964 Santangelo
3,927,505 A 12/1975 Bemiss
(Continued)

FOREIGN PATENT DOCUMENTS

AT 307308 B 5/1973
DE 1217841 B 5/1966
(Continued)

OTHER PUBLICATIONS

PCT/NO2021/050120, "International Search Report and Written Opinion", Jul. 8, 2021, 17 pages.
NO 20210231, "Norwegian Office Action", Jan. 6, 2022, 4 pages.
PCT/NO2021/050120, "International Preliminary Report on Patentability", Mar. 31, 2022, 6 pages.
Extended European Search Report issued in related European Patent Application No. EP21804341.2 on Jun. 20, 2024, 10 pages.

*Primary Examiner* — Christopher R Demeree
(74) *Attorney, Agent, or Firm* — Kilpatrick Townsend & Stockton LLP (57) ABSTRACT

The disclosure relates to a cardboard box for holding content comprising liquid and/or gas. The box comprising: 3 or more side walls and a bottom side, a layer of liquid and/or gas non-permeable coating, every side wall having on its upper end a brim/collar area, the brim/collar area being folded to form an unbroken encircling receiving surface for attaching a lid foil.

15 Claims, 10 Drawing Sheets

(51) Int. Cl.
   *B65D 5/24*   (2006.01)
   *B65D 5/44*   (2006.01)
   *B65D 5/56*   (2006.01)
   *B65D 5/62*   (2006.01)
   *B65D 5/64*   (2006.01)
   *B65D 77/20*  (2006.01)

(52) U.S. Cl.
   CPC ............. *B65D 5/563* (2013.01); *B65D 5/62* (2013.01); *B65D 5/64* (2013.01); *B65D 77/2024* (2013.01); *B65D 2577/2025* (2013.01)

(58) Field of Classification Search
   CPC ............. B65D 5/64; B65D 77/2024; B65D 2577/2025; B65D 5/56; B65D 5/321; B65D 1/34; B65D 5/243; B65D 5/28; B65D 5/242; B65D 5/443; Y02W 30/80; B31B 50/00; B31B 50/46; B29L 2031/7162; B65B 5/026; B65B 7/2878
   USPC ...... 229/247, 125.35, 169, 186, 163, 103.11, 229/170, 406, 5.84; 156/224; 206/519; 426/115, 106; 493/95, 129
   See application file for complete search history.

(56) References Cited

U.S. PATENT DOCUMENTS

| | | | |
|---|---|---|---|
| 4,019,675 A | | 4/1977 | Andersson |
| 4,304,352 A | * | 12/1981 | Humphries .......... B65D 5/2047 |
| | | | 229/125.35 |
| 5,029,750 A | * | 7/1991 | Artusi .................. B65D 81/343 |
| | | | 426/106 |
| 5,351,879 A | | 10/1994 | Liu |
| 11,104,476 B2 | * | 8/2021 | Zhang ................. B65D 25/101 |
| 2003/0226881 A1 | * | 12/2003 | Liou ..................... B65D 5/246 |
| | | | 229/4.5 |
| 2012/0292813 A1 | | 11/2012 | Middleton |

FOREIGN PATENT DOCUMENTS

| | | | |
|---|---|---|---|
| DE | 3506235 | | 7/1986 |
| DE | 3810799 A1 | | 10/1989 |
| DE | 19615648 A1 | | 10/1997 |
| DE | 102019122139 A1 | * | 2/2021 |
| EP | 0687631 A1 | * | 12/1995 |
| JP | 2011235952 A | | 11/2011 |
| WO | 86/04880 | | 8/1986 |
| WO | WO-2019020863 A2 | * | 1/2019 ........... B29C 43/203 |

\* cited by examiner

CARDBOARD BOX FOR HOLDING CONTENT, AND A METHOD FOR USING SUCH

TECHNICAL FIELD

The present disclosure relates to a cardboard box for holding content. More specifically, the disclosure relates to a cardboard box for holding content as defined in the introductory parts of and claim 1.

BACKGROUND ART

The packaging industry for packaging portions and small quantities of liquid and gaseous and the like content is dominated by plastic and aluminum based packaging solutions. Recent discoveries have proven that use of plastic is a real threat to nature, and it has become evident that humans need to produce less plastic and/or expensive to recycle waste.

Using environmentally friendly materials in such packaging is problematic, since the requirement for goods safekeeping, fresh keeping, transport friendliness and production cost are all elements that need to be considered when selecting packaging method and material.

Plastic packaging has proven to be cheap and easy to produce, easy to make robust enough to stack, and product quality can be maintained at an acceptable level. The flexibility of plastic and the ability to produce almost any form using production techniques such as machines that can heat the plastic material (PVC, PP, PE, POF, PPT, PTGF, APET, ABS, OPP, PS, PET, etc) and make them soft, then vacuum suction and transform sheet material into various plastic blisters, or extruding techniques is considered a great advantage. The natural non-permeability is also a desired feature of plastic when packaging liquid/floating materials, such as butter, or gaseous matter such as chicken and a gas such as $CO_2$ in a tight enclosure for keeping the meet fresh longer.

When minimizing the use of plastic in packaging, a problem associated with non-softening or non-extrudable materials is how to make the packaging flexible, reusable, strong and at the same time made at an acceptable production cost.

When producing packaging for liquid and gaseous products for the consumer market, it is also vital to provide a packaging that can store products in a manner that helps preserve the product, providing an environment that is endurable for the packaged products. Problems are typically associated with leakage through the package material, withstanding moisture from the environment and the packaged goods, and use of environment friendly materials.

The cardboard industry has made some attempts to replace plastic in packaging of food, fruit and vegetable products, but have not succeeded in packaging liquid products in an acceptable manner. Specific challenges is for packing a consumer product such as butter. Something that is used in almost all homes. It is a challenge to package oily liquid/semi liquid products. A product such as butter, which from the consumer perspective has long shelf life, compared to other liquid/moisture food products, must be packaged in a cheap container that is able to withstand leaking through the container material. Up to present, only plastic has that characteristics.

A further challenge is for packaging products relying on being surrounded by a bacteria prevention gas, such as poultry products that is packaged with an ambient $CO_2$ gas. For this purpose, the package container must be, not only moisture non-permeable, but also gas non-permeable. This is a huge challenge if one is attempting to move away from plastic packaging, at least when the goal is to use environmental friendly and cheap material and process to be able to be used in the mass market.

SUMMARY

It is an object of the present disclosure to mitigate, alleviate or eliminate one or more of the above-identified deficiencies and disadvantages in the prior art and solve at least the above mentioned problem. According to a first aspect there is provided a cardboard box for holding content comprising liquid and/or gas, the box comprising: 3 or more side walls and a bottom side, a layer of liquid and/or gas non-permeable coating, every side wall having on its upper end a brim/collar area, the brim/collar area being folded to form an unbroken encircling receiving surface for attaching a lid foil, the brim/collar area having on every other side wall, on the distal part of the brim/collar, a further foldable brim/collar portion comprising on its lateral sides first corner connecting means, and the brim/collar area of the other side walls having corresponding second corner connecting means, such that when the brim/collar of every other side is folded upon itself the first corner connecting means of the further folded brim/collar portions constitutes the underside of a connection with the lateral other side walls second corner connecting means, such that when the brim/collar areas are connected they provide an unbroken smooth even upward facing surface.

Working with coated cardboard, one cannot rely on extruded or blister production methods, and a template must be folded to desired form. In order to keep floating or gaseous material inside a container of said cardboard, the container must be made without leaking conduits, ether in the container walls/bottom, and not in the connecting areas between box and lid. Thus providing an absolutely even surface for attachment of lid is required. The brim/collar portions constitutes this in present invention.

According to some embodiments, the brim/collar area being folded outwards.

Having a brim/collar portions folded outwards will enable heat/pressure tools for attaching the a lid, after the container/box is filled with a product, to access brim/collar portions under- and above-side.

According to some embodiments, the further folded brim portion the cardboard comprises sideways protruding corner connecting members, and the brim area of the other side walls having corresponding protruding corner connecting members, such that when the brim/collar of every other side wall is folded upon itself, the protruding corner member of the further folded brim/collar portions constitutes the underside of a connection with the lateral other side walls folded connecting member, such that when the brim/collar areas are connected they provide an unbroken smooth even upward facing surface.

The manner in which the connecting members are arranged on each other in layers and such that the brim/collar areas are provided in an unbroken smooth even upward facing surface, the lid may later be attached and provide a liquid and/or gas non-permeable binding between lid and box.

According to some embodiments, the cardboard box having uneven number of side walls, and the last side wall having on its upper end a brim/collar area being formed as a second corner connecting means towards the lateral side being one of the every other side wall, and as a first corner connecting means towards the lateral side being one of the other side walls.

Thus a form of triangle, pentagon, and other maybe provided. In a market of vast number of producers and outlets, it may be necessary to provide packaging of not only the most common forms, 4 sided containers. The present invention may be provide in shapes of even and odd numbers of side walls.

According to some embodiments, the cardboard comprises: an adhesive component arranged on the outer side of the outward folding brim/collar area or on the inside of the inward folding brim/collar area of the every other side, such that when folded it provides for holding the fold, and providing a adhesive component for fastening the protruding corner member of the further folded brim/collar portion of the lateral side walls outward folded connecting member.

Coating is a cost increasing element, and there may be necessary to provide the cheapest possible unit to challenge the environmentally dangerous plastic containers, also for non-costly products. Thus a non-permeable layer may be provided on only one side, and when folding and fastening of the brim/collar portions are done in production, the outside area must be applied with an adhesive component in those areas that are to provide an adhesive force.

According to some embodiments, the liquid and gas non-permeable coating is applied to one or both of the inside and the outside of the cardboard box before or after the folding of the cardboard box.

Double sided coating provides double prevention of inside products leaking through, not only from inside and out, but also for outside damp environment to damage the packaging box.

According to some embodiments, the adhesive component is constituted of the non-permeable coating, and the non-permeable coating is such that it can be made adhesive by heat/pressure sealing.

Some coatings become adhesive when pressurized or warmed. This effect reduces the process steps for making the cardboard box from a template.

According to some embodiments, the cardboard box is provided by a single piece of a production template of the cardboard box.

According to some embodiments, the cardboard comprises: a foldable area between the side walls for being folded outwards and being arranged at the outside of a side wall, such that when folded the cardboard box provides a smooth inner container space. Floating products, and/or bacteria vulnerable products are better stored in containers having even surfaces and no folds or cracks where product may be inaccessible, or where bacteria may grow more easily.

According to some embodiments, the cardboard comprises an adhesive component arranged on one or both sides of the foldable area between the side walls, for fastening and holding in place the outward folded foldable area when the cardboard box is folded.

According to some embodiments, the cardboard comprises: a high moisture content, and a removable gas or fluid non-permeable lid foil, wherein the removable lid foil being attached in a gas and/or fluid non-permeable manner to the unbroken smooth even upward facing surface of the brim/collar of the cardboard box such that the space inside the cardboard box is completely closed on all sides, top and bottom.

According to some embodiments, the cardboard comprises: a reusable protective lid, the reusable protective lid having on its underside a recess form corresponding to the outer shape of the cardboard box or brim/collar of the cardboard box, and the recess form the cardboard comprises holding elements such that when placed over the cardboard box it can be mounted and unmounted as desired.

Since the removable lid is in most cases intended only for one time use, a protective lid is advantageously provided in order for protecting the content whilst stored in the box after first time opening. Some products, which are supposed to be completely consumed upon opening first time may be provided without reusable lid.

According to some embodiments, the cardboard box have 4 sides.

According to some embodiments, the adhesive component is one or more of: fast curing non-toxic glue, heat/pressure activatable adhesive component.

The food industry is focused on not using packaging representing risk of toxic contamination of the packaged food. Thus, when present invention is provided the form holding features may be provided by toxic free adhesives, or by heat/pressure process converting non-toxic leaking surface coating to adhesive coating.

According to some embodiments the adhesive component is arranged on the full width of an upper region of one half of the inside foldable area between the side walls, and on the upper region of the outside of only the half of the foldable area that is to be facing towards the side wall when folded.

According to some embodiments, the liquid and gas non-permeable coating is one of, but not limited to: Poly Propylen, PP, Poly Ethylen, PE, paint/varnish coating of chemical and/or organic compounds, blister varnish/coating, alu foil, or plastic foil.

According to some embodiments, the brim/collar area being folded inwards, and the connecting members being altered correspondingly.

It is thus provided a box with minimum area footprint, and even more environmental friendly as the products may be more efficiently be stacked when transported.

According to some embodiments, the cardboard box is made of a recyclable material such as cardboard.

Cardboard is an easily recyclable material, and there is an urge in the market to try finding areas where cardboard may replace plastic products. One could also see that present invention may be provided with other future environmentally friendly materials. It should be understood that such materials also falls under present invention.

According to some embodiments, removable gas or fluid non-permeable lid foil is made of a recyclable material such as cardboard.

Although cardboard is a preferred material for the removable lid, there may be requirements prohibiting this, for example that the removable lid is transparent. Other materials may thus be chosen without deviating from the inventive concept of present invention.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

TERMINOLOGY

The term "cardboard" is to be interpreted as any type of cartoon, cardboard, cartonboard, paperboard, fibreboard and other material usable for production of containers folded from templates, and usable for packaging products.

The term "non-permeable coating" is to be interpreted as any type of coating, pre or post production, applied to the box material of present invention, the coating may be one of, but not limited to: Poly Propylene (PP), Poly Ethylene (PE), paint/varnish coating of chemical and/or organic compounds, aluminum foil, plastic foil, or other.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 3A-F shows the cardboard box brim/collar folding sequence of further brim/collar area FIG. 9A-C shows different views of assembled cardboard box shown in FIG. 8

FIG. 10 B-D shows various steps of assembly process of cardboard box and supporting frame shown in FIG. 10A

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
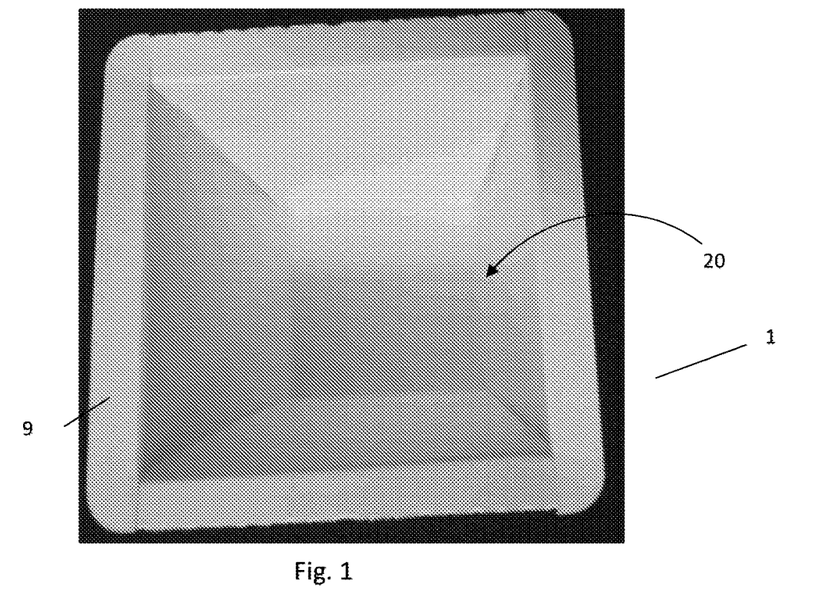
FIG. 1 shows the cardboard box in one embodiment from above angle
Figure 2:
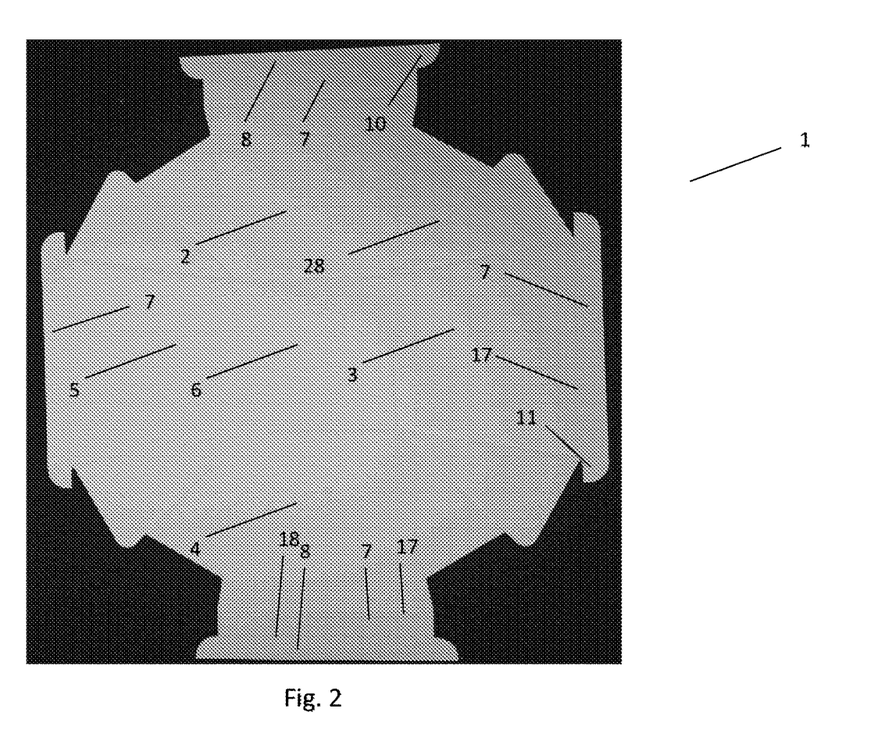
FIG. 2 shows the cardboard box of FIG. 1 template

An embodiment of the cardboard box of present invention is shown in FIG. 1 of the cardboard box folded and produced of the cardboard template as illustrated in FIG. 2.

The first aspect of this disclosure shows a cardboard box for holding content comprising products and/or liquid and/or gas, the box comprising: 3 or more side walls 2, 3, 4, 5 and a bottom side 6, a layer of liquid and/or gas non-permeable coating, every side wall 2, 3, 4, 5 having on its upper end a brim/collar area 7, the brim/collar area being folded to form an unbroken encircling receiving surface 9, 9' for attaching a lid foil, the brim/collar area having on every other side wall 2, 4, on the distal part of the brim/collar, a further foldable brim/collar portion 8, 8' comprising on its lateral sides first corner connecting means 10, 10', and the brim/collar area of the other side walls 3, 5 having corresponding second corner connecting means 11, 11', such that when the brim/collar 7, 8 of every other side 2, 4 is folded upon itself the first corner connecting means 10, 10' of the further folded brim/collar portions 8, 8' constitutes the underside of a connection with the lateral other side walls 3, 5 second corner connecting means 11, 11', such that when the brim/collar areas are connected they provide an unbroken smooth even upward facing surface 9, 9'.

The non-permeable coating may be applied at any time from production of the cardboard template to the time prior to filling and attaching lid/top foil, and use, including after folding and fixing.

Figure 7A:
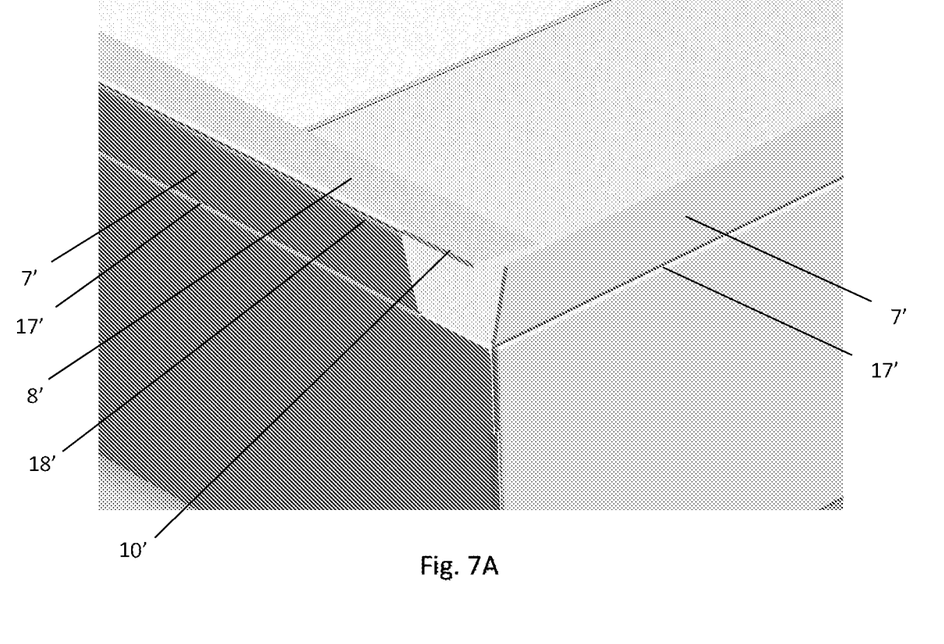
FIG. 7A-C shows the cardboard box with an inward folded brim/collar folding sequence

In one embodiment the brim/collar area 7, 8 is folded outwards as seen in the FIGS. 1 and FIGS. 3-6. For production convenience the outward folding is considered advantageous, but as seen later and exemplified by FIG. 7A-C, there is an option to fold the brim/collar 7', 8' inwards, and thus minimize the circumference footprint.

The concept of present invention is to provide an absolutely even encircling surface 9, 9' for attaching a lid, and an non-permeable containment room for holding a product which may be comprising liquid, gas or a combination of solid product and liquid/gas. Specifically the areas of the folded corner areas, and the brim section connections of the side walls, are challenging areas that may provide leaking through holes/conduits.

Figure 4A:
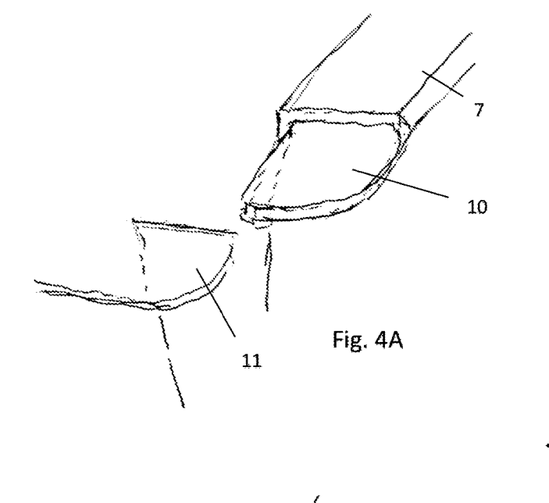
FIG. 4A-E shows a detail of the cardboard box brim/collar folding and connecting corner sequence
Figure 4B:
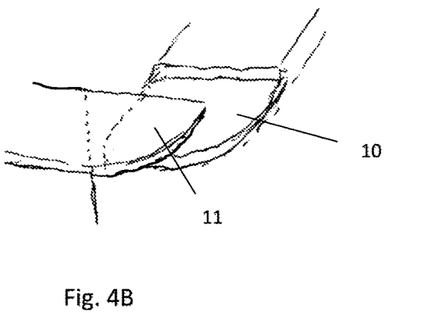
Figure 4C:
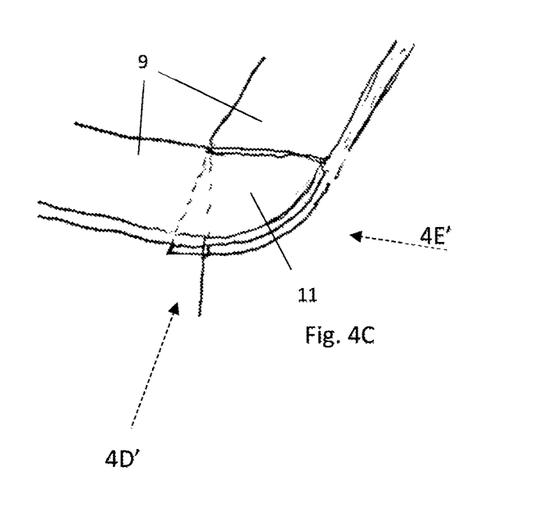
Figure 4D:
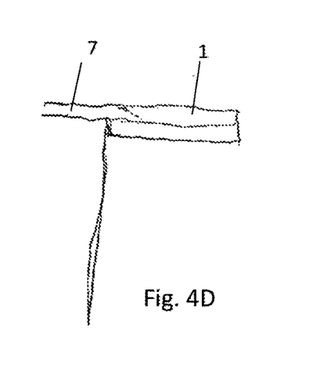
Figure 4E:
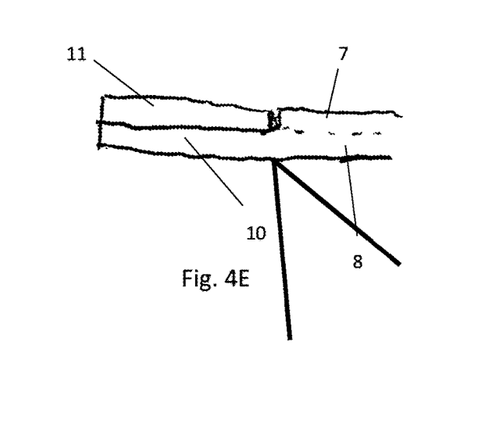
Figure 5:
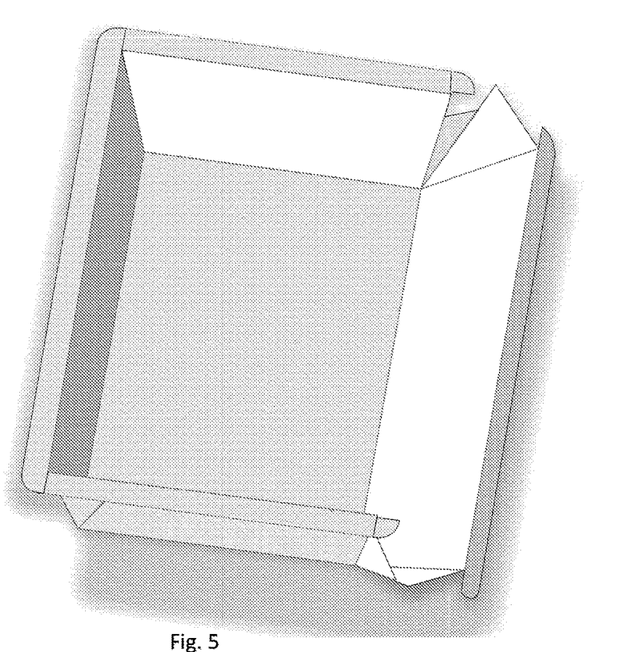
FIG. 5 shows a semi folded version of the cardboard box
Figure 6:
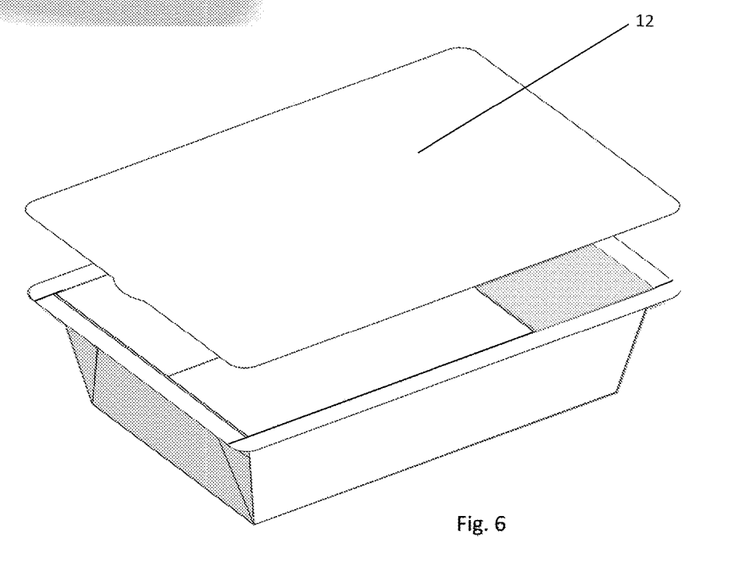
FIG. 6 shows the cardboard box with a removable lid before/after attached

Also in an embodiment of present invention the further folded brim portion the cardboard comprises sideways protruding corner connecting members 10, 10', and the brim area of the other side walls 3, 5 having corresponding corner connecting members 11, 11', such that when the brim/collar of every other side wall 2, 4 is folded upon itself, first along a lower fold line 17 and then again along an upper fold line 18, the protruding corner member 10, 10' of the further folded brim/collar portions constitutes the underside of a connection with the lateral other side walls 3, 5, folded along only a lower fold line 17, connecting member 11, 11', such that when the brim areas 7, 7' are connected they provide an unbroken smooth even upward facing surface 9, 9' continuous around the complete circumference of the top side of the box This specific folding of the further folded brim portion 8 and protruding corner member 10 are illustrated in one embodiment in section FIGS. 3A-F, and the lateral brim area connections are illustrated in one embodiment in FIGS. 4A-C. The side view profile illustrations in FIGS. 4D and 4E shows the effect of providing an even top surface in the connection seen from the other side wall 3, 5 side and the every other side wall 2, 4 side correspondingly.

Figure 7B:
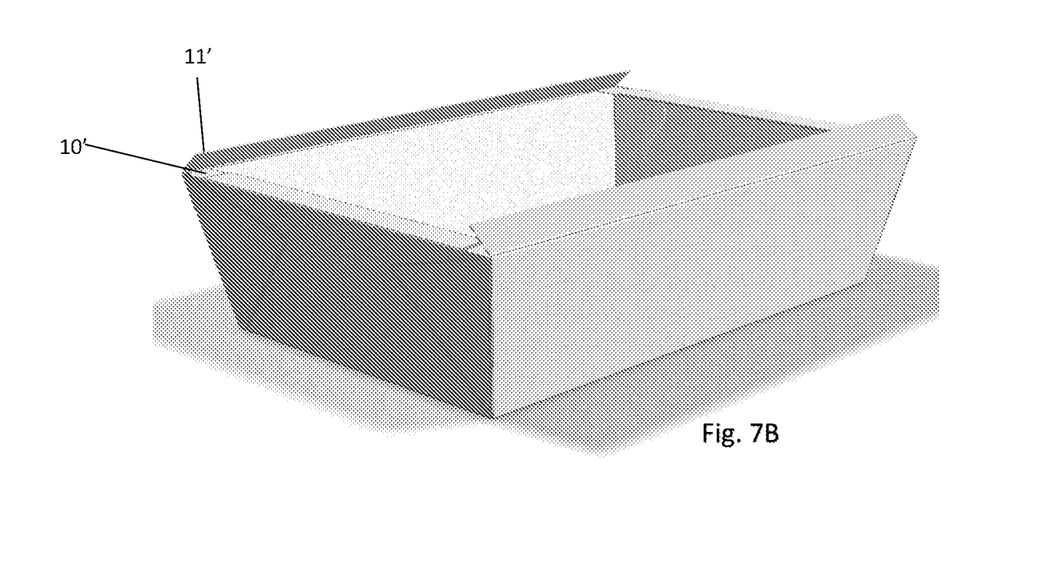
Figure 7C:
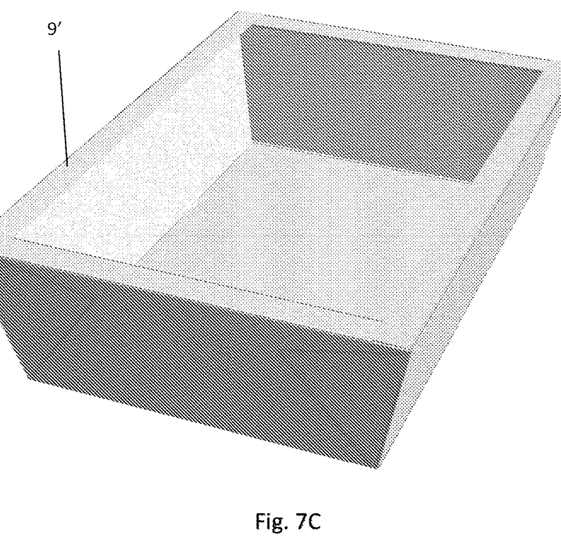

When the brim/collar folds outwardly, the connecting member 11 of the brim area 7 protrudes to match the protruding corner member 10 of the neighbor brim area 8, and when the brim/collar folds inwardly, the connecting member 11' is constituted by the outer end of the brim area 7 which will fold over and into the receiving area provided by the protruding corner member 10' of the neighbor brim area 8' as seen in FIG. 7B.

In a further embodiment the cardboard box 1 may be provided with uneven number of side walls, and the last side wall having on its upper end a brim/collar area 7 being formed as a second corner connecting means 11, 11' towards the lateral side being one of the every other side wall 2, 4, and as a first corner connecting means 10, 10' towards the lateral side being one of the other side walls 3, 5.

Figure 3A:
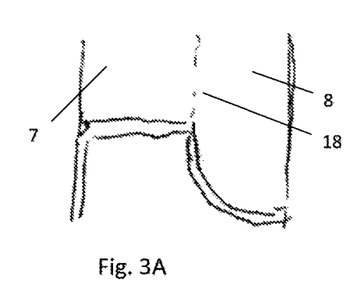
Figure 3B:
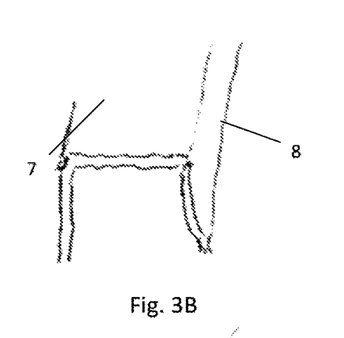
Figure 3C:
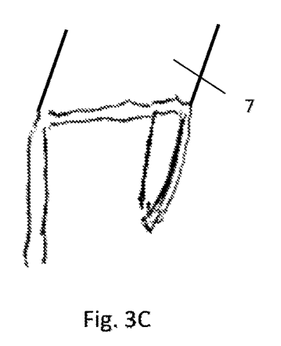
Figure 3E:
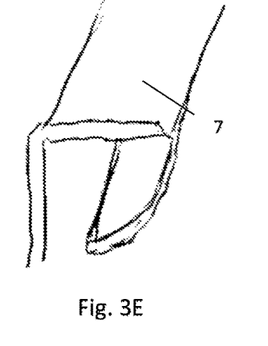
Figure 3F:
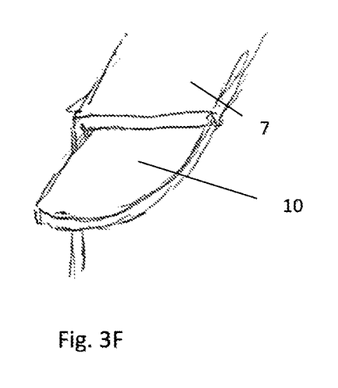
Figure 3G:
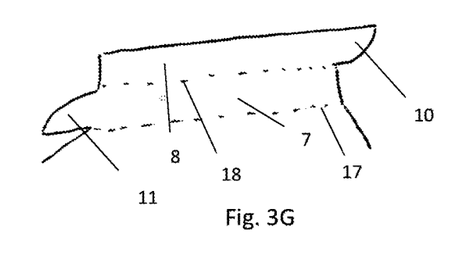
FIG. 3G-H shows the cardboard box brim/collar folding sequence of brim/collar area of the last of the sides in an odd number sided box
Figure 3H:
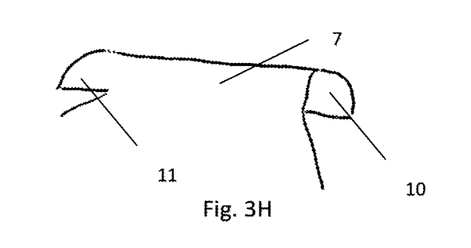

It is possible under the inventive concept of present invention to provide a box form of for example a triangle, a pentagon, or even more odd numbered sides. Using the concept of present invention then requires the last odd side to be formed to connect to on each side connect to a different corner connecting means 10, 11 as illustrated in one embodiment in FIGS. 3G and 3H. Although packaging of 4 sided containers is the most common need, the present invention may thus be provide in shapes of even and odd numbers of side walls.

The cardboard may comprise an adhesive component arranged on the outer side of the outward folding brim/collar area 7, 8 or on the inside of the inward folding brim/collar area 7', 8' of the every other side 2, 4, such that when folded it provides for holding the fold, and providing an adhesive component for fastening the protruding corner member 10, 10' of the further folded brim/collar portion of the lateral side walls folded connecting member 11, 11'. The folding itself must be reinforced, either by applied glue/adhesive or het/pressure adhesive as result of a process of heating/pressurizing an area having a coating that also comprise adhesive characteristics when heated/pressurized. Typically the heating/pressurizing is part of the machine folding apparatus normally used for providing containers from templates.

In a further embodiment of present invention the liquid and gas non-permeable coating is applied to one or both of the inside and the outside of the cardboard box before or after the folding the cardboard box.

Packaging of troublesome material such as butter or oil-rich substances increase the requirement to the material of the container. Cardboard is vulnerable to oily/moisture content, and will deteriorate quickly if exposed to such substances. Double sided coating provides double prevention of inside products leaking through, not only from inside and out, but also for outside damp environment to damage the packaging box.

In a further embodiment of present invention the adhesive component is constituted of the non-permeable coating, and the non-permeable coating is such that it can be made adhesive by heat/pressure sealing.

This is in case of pressure sealing sometimes referred to as coldseals and comprise adhesives which form an elastic film on a wide range of different substrates such as paper, PP, Coex PP, PE. They may be applied via printing processes, including pattern application, to allow different seal characteristics to be achieved. As pressure-reactivated systems, no heating is required to obtain adhesion: two coated substrates only have to be pressed together. With a release lacquer or a release layer on the opposite side of the substrate, the coated material may be stored in reels or stacks without sticking together before assembly.

A combination of adhesive methods may be envisaged in present invention, in that for example the pre applied non-permeable coating is used as a coldseal on the brim/collar area 7, and a different adhesive method is used for the foldable area 28 between the side walls.

Coating is non-permeable for holding gas and/or liquid, and may be one or more of, but not limited to: Poly Propylen (PP), Poly Ethylen (PE), paint/warnish coating of chemical and/or organic compound, comprising also water based lacquers as used in the blister lacquer industry.

In a further embodiment of present invention the cardboard box is provided by a single piece of a production template of the cardboard box.

In a further embodiment of present invention the cardboard comprises: a foldable area 28 between the side walls for being folded outwards and being arranged at the outside of a side wall, such that when folded the cardboard box provides a smooth inner container space 20.

Although the folding is provided in the examples and advantageous embodiments of present invention, it is within the inventive concept of present invention to provide the folding inwardly, For example when the product to be packaged is not likely to have its quality deteriorate by being packaged in a container having folds and the like. For example metal parts packaged in an non oxidizing gas for preservation.

In a further embodiment of present invention the cardboard comprises an adhesive component arranged on one or both sides of the foldable area between the side walls, for fastening and holding in place the outward folded foldable area when the cardboard box is folded.

There is a few weak links in the assembled template, where the cardboard box solution of present invention must provide additional features compared to a traditional box. One is the above discussed brim/collar area, and in the corner connecting areas, there is provided a method for providing a smooth contact surface for the later attachable foil 12. The connection area may comprise additional layers of tightening/adhesive material for enhancing the prevention of leaking conduits when sealed with the removable lid. A further area is the area between the sidewalls that are folded outwards or inwards when mounted. Specific attention is made to these elements when folded and "glued" to the side wall of the box. In the figures the fold is folded outwards and blued to outside of the every other side wall. Other folding direction may be envisaged without reducing the inventiveness of present invention.

In a further embodiment of present invention the cardboard comprises: a high moisture content, and a removable gas or fluid non-permeable lid foil 12, wherein the removable lid foil being attached in a gas and/or fluid non-permeable manner to the unbroken smooth even upward facing surface 9 of the brim/collar of the cardboard box such that the space inside the cardboard box is completely closed on all sides, top and bottom.

This removable lid foil may be of cardboard or any other non-permeable material suited for sealing attachment, by adhesives as discussed above, glue or other, to the upper surface of the brim/collar of the cardboard box of present invention. The basic idea is to provide an even complete (unbroken) surface of the brim/collar, and the removable lid is fastened to completely cover the container room of the cardboard box and the brim/collar area, such that the container room is completely sealed off from the environment. When the cardboard box contains products composed wholly or partly of liquid, moisture, greasy, oily, buttery products or in other cases a combination of such products and gasses, no parts of the contained matter can leak/escape from the cardboard box until the removable lid is removed.

In a further embodiment of present invention the cardboard comprises: a reusable protective lid, the reusable protective lid may be provided with on its underside a recess form corresponding to the outer shape of the cardboard box or brim/collar of the cardboard box, and the recess form the cardboard comprises holding elements such that when placed over the cardboard box it can be mounted and unmounted as desired.

As seen in many packaging solutions in industry, normally served by the plastic industry, packaging boxes are provided with a rip-off lid, and then additionally provided with a further reusable lid (not shown) for being fastened and unfastened repeatedly. Present invention comprise such reusable lid which may be of any material, but advantageously also in cardboard. Holding elements may be provided for example by: a lid frame embracing the brim/collar of the cardboard box such that it can slide on/off the cardboard box, friction elements on the inside of the frame of the lid interacting with the outer perimeter of the cardboard box, or any other known holding techniques.

Present solutions is provided in a further embodiment wherein the reusable lid may be provided with inward protruding ledges in the corners of the lid, and corresponding slots may then be provided in the upper portion of the corners of the box, wherein the protruding ledges of the lid can be inserted, and thereby provide a locking mechanism. This solution also provides a reusable feature in that when lid, when provided in a flexible/bendable material, can be removed and refitted to the box.

In a further embodiment of present invention the cardboard box have 4 sides.

4 sided boxes are the norm, and may be in any dimension and size. Rectangular, square, and more.

In a further embodiment of present invention the adhesive component is one or more of: fast curing non-toxic glue, heat/pressure activatable adhesive component, or any other sufficiently durable and environmentally accepted adhesive. Using any other form of adhesive is to be considered to fall within the protective scope of the invention. As more work is done to certify variations of adhesives and materials for pre-treating packaging items for carrying food and sensitive products, these materials may well be used in present invention to provide either fastening or non-permeability without deviating from the inventive concept.

In a further embodiment of present invention the adhesive component is arranged on the full width of an upper region of one half of one of the inside foldable area 28 between the side walls 2, 3, 4, 5, and on the upper region of the outside of the half of the foldable area 28 that is to be facing towards the side wall when folded.

The foldable area is one of the areas wherein leakages more easily may appear. The present invention has a solution wherein a tight non-permeable fold is provided by applying a glue/adhesive field covering the hole breadth of the foldable area inside the fold. Thus, when folded, any material being hold by the cardboard box cannot escape through the foldable area.

Further additional glue/adhesive and/or filler components may be added to vulnerable areas where holes/conduits may be tightened/strengthen by additional application of glue/adhesive.

Both inward and outward folding of the foldable area may be used.

In a further embodiment of present invention the liquid and gas non-permeable coating may be one of Poly Propylen, PP, Poly Ethylen, PE, paint/varnish coating of chemical and/or organic compounds, blister varnish/coating, alu foil, or plastic foil.

As discussed above present invention also encompass future and present coating compounds, either new or newly certified for use in combination with packaged goods.

In a further embodiment of present invention the brim/collar area 7', 8' being folded inwards, and the connecting members 10', 11' being altered correspondingly.

In a further embodiment of present invention the cardboard box is made of a recyclable material such as cardboard.

In a further embodiment of present invention removable gas or fluid non-permeable lid foil 12 is made of a recyclable material such as cardboard.

Now a further embodiment of present invention is described with reference to FIGS. 8-10D.

Figure 8:
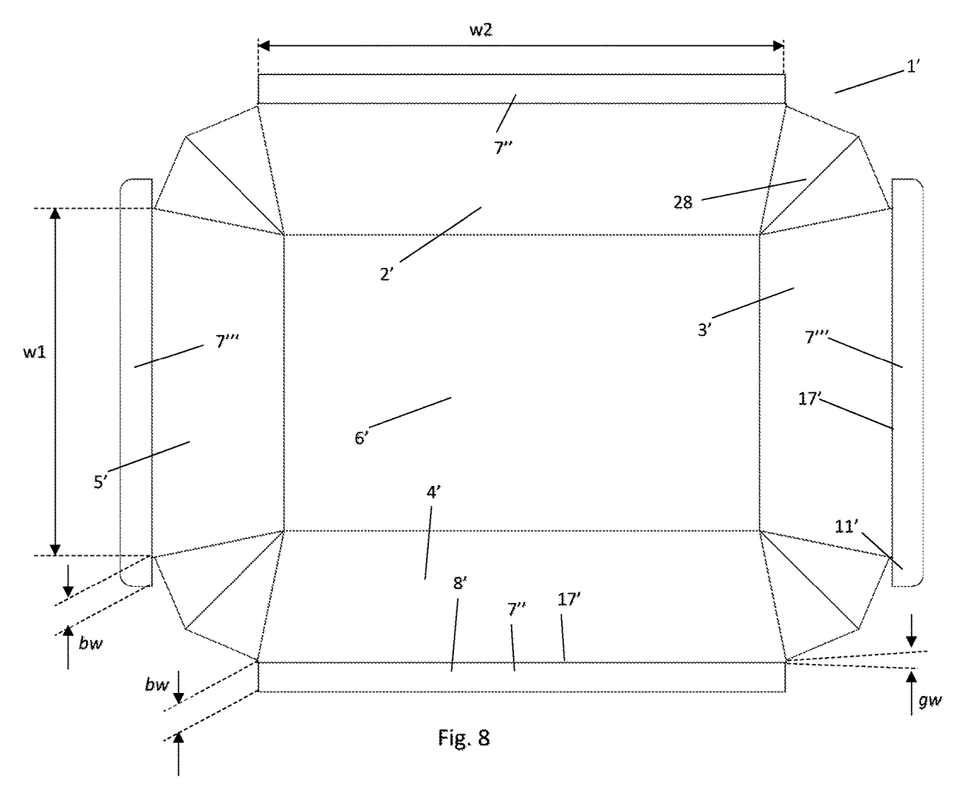
FIG. 8 shows a further embodiment of a cardboard box template

A template is illustrated in FIG. 8, showing a template for a four sided cardboard box with equal characteristics as discussed above. The difference lies in the design of the brim collar corner areas 30. No overlapping or support is provided for the adjacent side brim portion. When assembled there is an exact side by side fit, where every other sides 2', 4' brim length is equal to the top side width, and every second other side 3', 5' has protrusions the length of the width bw of the every other side brim 7'. This means that the total length of the every second other side 3', 5' brim is equal to top side width w1+the sum of every other side brim widths bw.

When folded out, the lateral portion of the brim 7" of every other sides 2', 4' aligns towards the lateral portion of the brim 7''' of every second other side 3', 5'.

The brim corner 30 will thus when assembled provide an even and unbroken upward facing surface of a brim encircling the complete perimeter of the cardboard box 1, 1'.

Figure 9A:
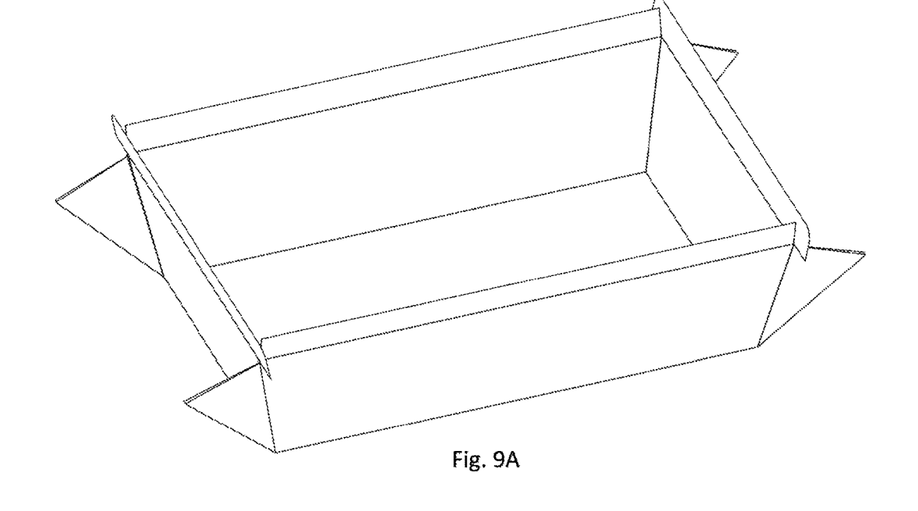
FIG. 9A-C shows various steps of assembly process of cardboard box shown in figure
Figure 9B:
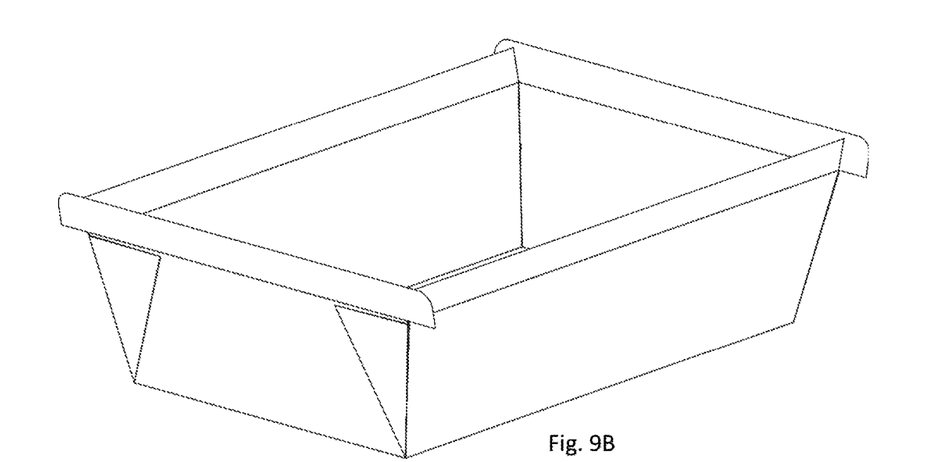
Figure 9C:
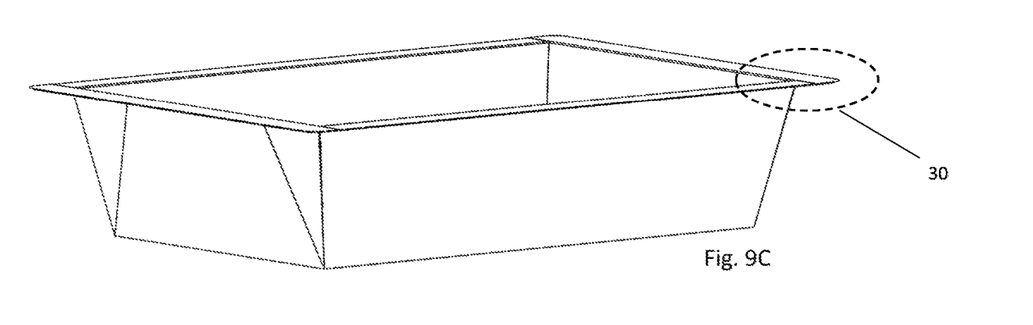
Figure 9D:
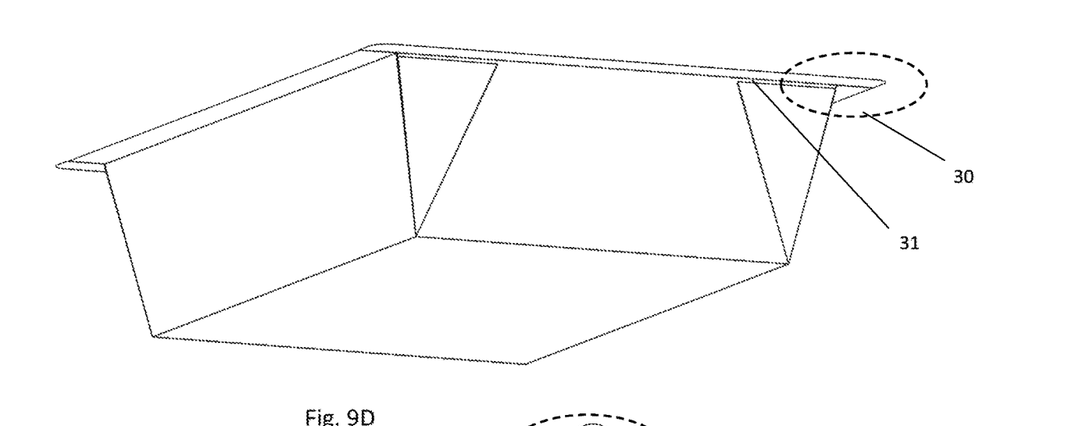
Figure 9E:
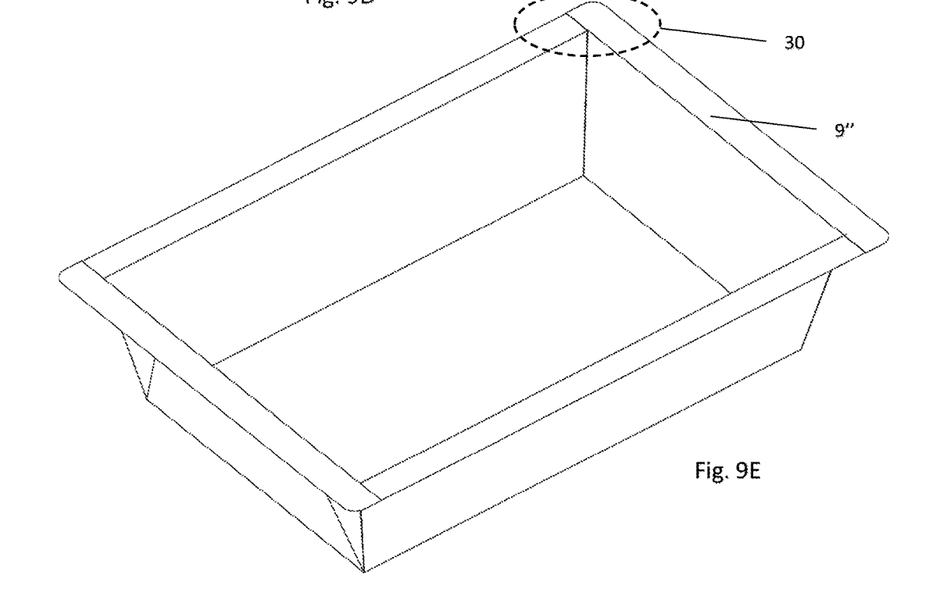

The foldable area 28 between the side walls for being folded outwards and being arranged at the outside of a side wall, is provided with a slightly lower height than the walls. The height difference gw provides a recess/slot 31 between the folded portion and the underside of the brim 7" as seen in FIG. 9D.

Figure 10A:
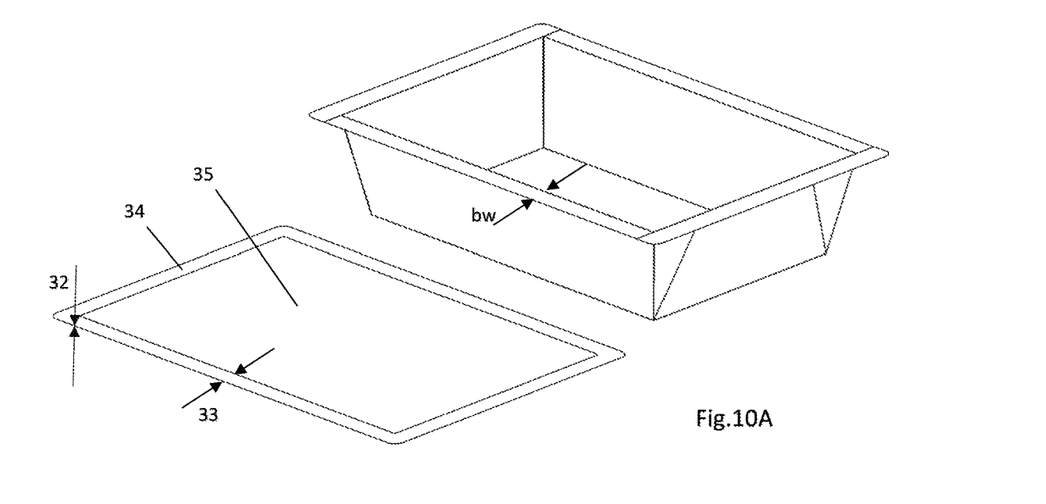
FIG. 10A shows cardboard box shown in FIG. 8 and collar support template
Figure 10B:
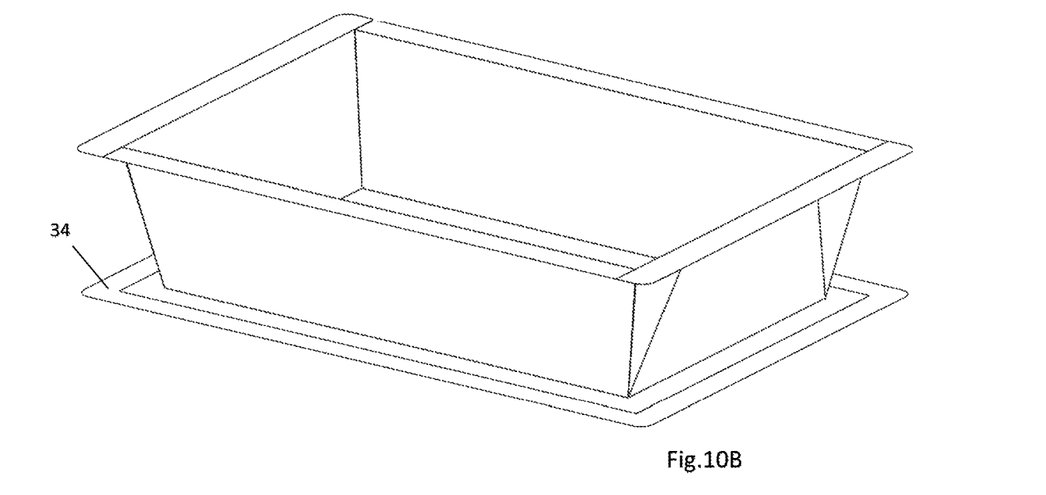
Figure 10C:
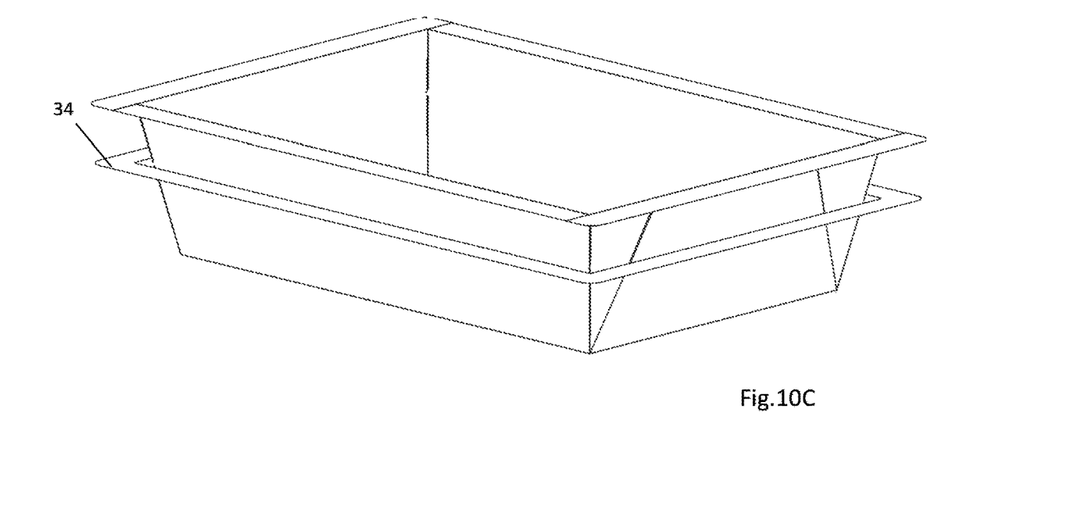
Figure 10D:
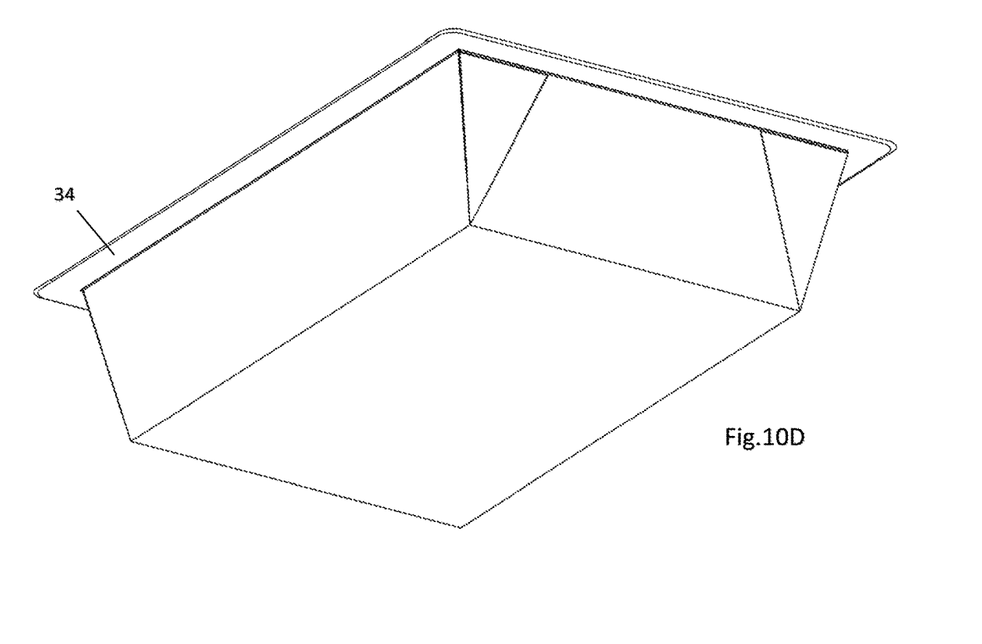

To provide an airtight brim corner 30 area and a stabilized brim 7", 7''', it is provided a supporting encircling brim frame 34, having an inner opening 35 with a form an size substantially corresponding to the outer cross section of the cardboard box 1' at the height level underneath the brim. When the supporting brim frame 34 is arranged around the cardboard box 1' as illustrated in the figure series 10 B-D, the supporting brim frame 34 with the tight fitting opening 35 will "click" into the recess/slot 31 formed between the folded foldable area 28 and the underside of the brim 7", 7''', such that the supporting brim frame 34 is arranged and attached to the brim.

The supporting brim frame 34 is advantageously of a thickness 32 less than the width of the recess/slot 31, but may vary to provide sufficient support for the cardboard box size and intended content.

A problem encountered when traditional packaging containers is used, both cardboard and of other materials, is that when a lid is pressure sealed to the top, the side wall may buckle and the peripheral areas of the lid/brim may fold upward out of the intended horizontal position. The thinner material in the container and lid foil, the greater deviation from the horizontal orientation of the peripheral areas of the lid/brim. This is an unwanted effect which may cause weakness in the tight fitting of the lid and reduced handling properties.

The supporting brim frame 34 may be fastened to the underside of the brim by a process of pressure sealing or the like as discussed above ensuring a much firmer base of the brim/collar area when a lid/sealing foil is attached to the unbroken smooth encircling receiving surface 9'' of the brim/collar 7'', 7'''. Thus, the intended horizontal position of the peripheral areas of the lid/brim is thereby provided. The encircling (360°) supporting brim frame 34 provides, not only an underlying base for the brim/collar, but also horizontal stability due to the encircling form corresponding to the outer form of the packaging box 1'.

As the tight fitting opening 35 ensures a close fit towards the outside of the packaging box just underneath the brim 7'', 7''', it provides support and structure to the brim, stiffness to the side walls, as well as providing an even further sealing off any possible leakage opening in the corner area of the brim and sidewalls.

Figure 11:
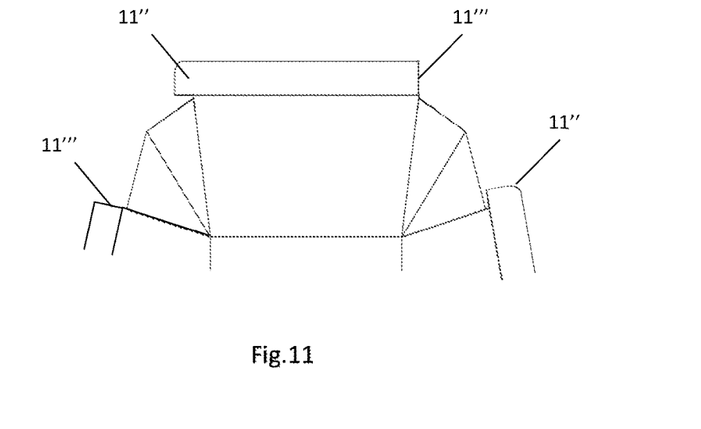
FIG. 11 shows the cardboard box brim/collar folding sequence of brim/collar area of the last of the sides in an odd number sided box of the further embodiment from FIG. 8

The supporting brim frame 34 comprising a non-permeable coating at least on its upper side facing the underside of the brim/collar area, and the non-permeable coating is such that it can be made adhesive by heat/pressure sealing when arranged and heat/pressure sealed to the underside of the brim 7'', 7'''. In a further embodiment the cardboard box is provided having uneven number of side walls, and the last side wall having on its upper end a brim/collar area 7, 7', 7'', 7''' being formed to pair with brim/collar area of different form on either side of the brim/collar area 11'', 11''', as illustrated in FIG. 11.

As seen in the figures and as can be understood by the explanatory text above the brim/collar area 7, 7', 7'', 7''', is being folded to a substantially perpendicular position relative the corresponding side wall 2, 2', 3, 3', 4, 4', 5, 5' to form an unbroken smooth encircling receiving surface 9, 9', 9'' for attaching a lid foil.

Although the most natural products to be packaged in the cardboard box of present invention is food products, there is nothing prohibiting it to be used for products that need to be stored in controlled environments. One could be metal parts being stored in a gaseous environment or in oil filled containers to prohibit deteriorating.

Meat, fish and vegetables may be packaged in a marinade and CO2 to achieve both taste additives and prolonged shelf life.

The person skilled in the art realizes that the present disclosure is not limited to the preferred embodiments described above. The person skilled in the art further realizes that modifications and variations are possible within the scope of the appended claims. For example, packaging of other goods than food for example rear metals or metals needing to be stored in oil and/or special gases, variations to the disclosed embodiments can be understood and effected by the skilled person in practicing the claimed disclosure, from a study of the drawings, the disclosure, and the appended claims.

The invention claimed is:

1. A cardboard box for holding content comprising:
   three or more side walls and a bottom side,
   a layer of liquid and/or gas non-permeable coating,
   every side wall having on an upper end, wherein the upper end of every side wall includes a brim/collar area, the brim/collar area being folded outwards in a non-overlapping tight fitting manner to a substantially perpendicular position relative a corresponding side wall of the three or more side walls to form an even and unbroken upward facing surface of a brim encircling a complete perimeter of the cardboard box for attaching a lid foil, the cardboard box further comprising:
   a supporting encircling brim frame template configured to be entered on an underside of the cardboard box and arranged under the brim, the supporting encircling brim frame template having an opening with a close fit towards an outside of the cardboard box just underneath the brim, for sealing off a corner area of the brim,
   the supporting encircling brim frame template comprising a non-permeable coating at least on an upper side of the supporting encircling brim frame template facing an underside of the brim/collar area, and the non-permeable coating is such that the non-permeable coating can be made adhesive by heat/pressure sealing when arranged and heat/pressure sealed to the underside of the brim.

2. The cardboard box according to claim 1, wherein
   a brim/collar area of every other side wall includes, on a distal part of the brim/collar area, a further foldable brim/collar portion comprising, on lateral sides of the further foldable brim/collar portion, first corner connecting means, and
   a brim/collar area of the other side walls having corresponding second corner connecting means, wherein
   the brim/collar area of every side walls is folded outwards such that, when the brim/collar area of every other side wall is folded upon itself and the first corner connecting means of the further foldable brim/collar portions constitutes an underside of a connection with the lateral other side walls a second corner connecting means of lateral other side walls and, the brim/collar area of every side wall are connected and provide the even and unbroken upward facing surface.

3. The cardboard box according to claim 2, wherein the further foldable brim/collar portions comprise sideways protruding corner connecting members, and
   the brim/collar area of the other side walls having corresponding protruding corner connecting members such that, when the brim/collar of every other side wall is folded upon itself and a protruding corner member of the further folded brim/collar portions constitutes an underside of a connection with a folded connecting member of the lateral other side walls, the folded brim/collar area of every side wall are connected and provide the even and unbroken upward facing surface.

4. The cardboard box according to claim 3, further comprising:
   an adhesive component arranged on an outer side of the brim/collar area of the every other side wall such that, when the brim/collar area of every side walls is folded, the adhesive component holds the brim/collar area of every side walls and fastens the sideways protruding corner member of the further foldable brim/collar portion of the folded connecting member of the lateral other side walls, wherein the adhesive component is constituted of the non-permeable coating, and the non-permeable coating is such that the non-permeable coating can be made adhesive by heat/pressure sealing.

5. The cardboard box according to claim 1, wherein the cardboard box having uneven number of side walls, and a last side wall of the three or more side walls having, on an upper end of the last side wall, a brim/collar area formed to pair with brim/collar areas of different forms on either side of the brim/collar area of the last side wall.

6. The cardboard box of claim 1, wherein the liquid and gas non-permeable coating is applied to one or both of inside of the cardboard box and the outside of the cardboard box before or after folding of the cardboard box.

7. The cardboard box of claim 1, wherein the cardboard box is provided by a single piece of a production template of the cardboard box.

8. The cardboard box according to claim 1, further comprising:
a foldable area between the three or more side walls for being folded outwards and being arranged at an outside of a side wall of the three or more side walls such that, when folded, the cardboard box provides a smooth inner container space.

9. The cardboard box according to claim 8, further comprising an adhesive component arranged on one or both sides of the foldable area between the three or more side walls, wherein the adhesive component is configured to fasten and hold in place the foldable area when the cardboard box is folded.

10. The cardboard box of claim 1, further comprising:
a high moisture content, and
a removable gas or fluid non-permeable lid foil configured for being attached in a gas and/or fluid non-permeable manner to the even and unbroken upward facing surface of the brim of the cardboard box such that a space inside the cardboard box is completely closed on all sides, top, and bottom.

11. The cardboard box of claim 1, further comprising:
a reusable protective lid having, on an underside of the reusable protective lid, a recess form corresponding to an outer shape of the cardboard box or brim/collar area of the cardboard box, and the recess form comprising holding elements such that when placed over the cardboard box the reusable protective lid can be mounted and unmounted as desired.

12. The cardboard box of claim 1, wherein the layer of liquid and gas non-permeable coating is one of Polypropylene, PP, Polyethylene, PE, paint/varnish coating of chemical and/or organic compounds, blister varnish/coating, or water based lacquers.

13. The cardboard box of claim 10, wherein any of the cardboard box or removable gas or fluid non-permeable lid foil is made of a recyclable material such as cardboard.

14. A method for storing content in a particular cardboard box comprising the following steps:
provide the cardboard box according to claim 1; and
arranging the supporting encircling brim frame template underneath the brim/collar area such that the supporting encircling brim frame template seals off the corner area of the brim and the three or more side walls to prohibit leaking of content.

15. The method according to claim 14, further comprising:
filling content into the cardboard box;
providing a removable lid foil configured to be attached and pressure sealed to the even and unbroken upward facing surface of the brim; and
attaching and pressure sealing the removable lid foil to the even and unbroken upward facing surface of the brim.

* * * * *